C. STADELMANN

Improvement in Glass-Molds.

No. 126,099.

Patented April 23, 1872.

WITNESSES.

R. C. Wrenshall

James J. Kay.

INVENTOR.

Carl Stadelmann
by his Attorneys
Barwell Christy n Kerr

126,099

UNITED STATES PATENT OFFICE.

CARL STADELMANN, OF PITTSBURG, PENNSYLVANIA.

IMPROVEMENT IN GLASS-MOLDS.

Specification forming part of Letters Patent No. 126,099, dated April 23, 1872.

SPECIFICATION.

*To all whom it may concern:*

Be it known that I, CARL STADELMANN, of Pittsburg, in the county of Allegheny and State of Pennsylvania, have invented a new and useful Improvement in Glass-Molds; and I do hereby declare the following to be a full, clear, and exact description thereof, reference being had to the accompanying drawing, forming a part of this specification, in which—

Figure 1:
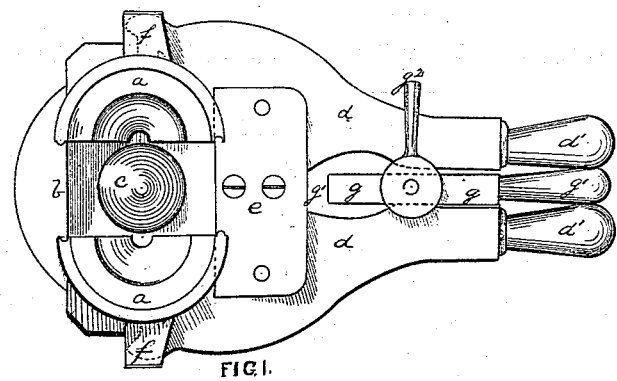
Figure 2:
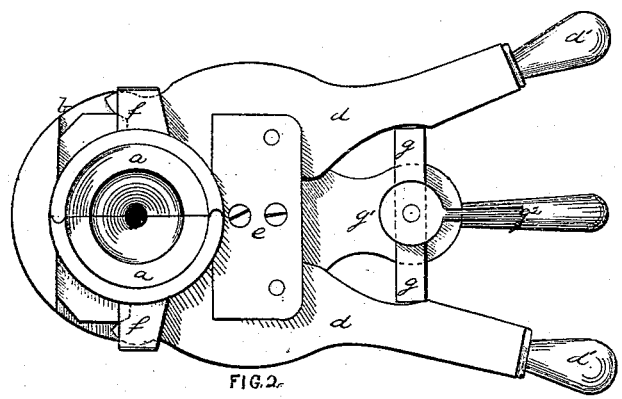
Figure 3:
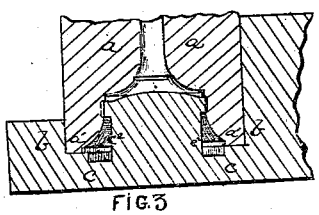

Figure 1 is a plan view of my improvement, the mold being open. Fig. 2 is a like view of the same, the mold being closed; and Fig. 3 is a vertical section of the bottom.

Like letters of reference indicate like parts in each.

My invention relates to the construction of improved devices for operating either or both parts of a two-part mold to or from the other.

To enable others skilled in the art to make and use my invention, I will describe its construction and mode of operation.

I take an ordinary two-part mold, $a$, and plane the lower ends $a'$ of the parts so as to make them fit into the guides $b$ on the bottom plate $c$. The parts of the mold are each operated to and from the other by means of the curved levers $d$, which are pivoted to the block $e$ and loosely attached by the yokes $f f$. The levers $d$ are operated so as to close the mold by means of the cam device $g$, which is loosely pivoted to the backward-extending plate $g'$, and stands between the levers toward their handles $d'$. The inner edge of the levers $d$ are made curved, so as to afford a bearing-surface for the cam $g$, when engaged by it. The cam $g$ is operated by the handle $g^2$, and is designed to be used for closing and holding the mold in that position when the article of glassware is being formed therein. After the article has been formed, and it is desired to remove it, the cam $g$ is disengaged and the mold opened, as shown in Fig. 1, by means of the levers $d$.

The parts of the mold, being actuated by the levers $d$, move in the guides $b$ to or from each other, as desired.

The form of the levers may be altered, if desired; but I find the form shown to be satisfactory in its operation.

It is not necessary that the parts should operate in guides, as shown, if the attachment and operation of the levers $d$ is such as to close them around the bottom $c$ without rubbing or cutting the sides. A suitable guide could be made by means of a pin projecting downward from the part into a groove in the bottom plate, or vice versa.

By the use of the cam $g$ operating in connection with the levers I am enabled to secure a very tight joint between the two parts of the mold. The form of the cam may be varied, if desired.

In case the contiguous edges of the two parts become worn, they may be filed or planed down, the mold rebored, and the cam $g$ lengthened correspondingly. The bottom plate $c$, which is shown in Fig. 3, is the same as was patented to me in Letters Patent No. 115,377. The cavity $c$ is made to receive the splinters of glass, which otherwise would come between the mold and bottom $c$ and prevent the parts from closing tightly.

In blow-molds it is not necessary that both of the "parts" be operative; one may be stationary and the other movable.

This invention may be applied to two-part molds of all kinds.

What I claim as my invention, and desire to secure by Letters Patent, is—

1. In combination with either half of a two-part mold, a lever, $d$, having its fulcrum at a point intermediate between the mold and the handle-end, substantially as and for the purposes set forth.

2. A cam device, operative against the lever $d$ of one-half of a two-part mold, and in combination therewith, whether the other half of the mold be fixed or movable, substantially as described.

3. A double cam device, operative against the levers $d$, and in combination therewith and the mold $a$, substantially as described.

In testimony whereof I, the said CARL STADELMANN, have hereunto set my hand.

CARL STADELMANN.

Witnesses:
B. PAGE, Jr.,
JAMES J. KAY.